(12) United States Patent
Kohli et al.

(10) Patent No.: US 11,023,637 B1
(45) Date of Patent: Jun. 1, 2021

(54) HYBRID DEFERRED ASSERTION FOR CIRCUIT DESIGN

(71) Applicant: Cadence Design Systems, Inc., San Jose, CA (US)

(72) Inventors: Amit Kohli, Faridabad (IN); Sulabh Nangalia, Noida (IN); Apurva Kalia, Lexington, MA (US); Yonghao Chen, Wayland, MA (US); Mickey Rodriguez, Austin, TX (US); Abhishek Kanungo, Groton, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/722,842

(22) Filed: Dec. 20, 2019

(51) Int. Cl.
*G06F 30/3312* (2020.01)
*G06F 30/327* (2020.01)
*G06F 30/367* (2020.01)

(52) U.S. Cl.
CPC ........ *G06F 30/3312* (2020.01); *G06F 30/327* (2020.01); *G06F 30/367* (2020.01)

(58) Field of Classification Search
USPC ....................................................... 716/108
See application file for complete search history.

(56) References Cited

U.S. PATENT DOCUMENTS

| | | |
|---|---|---|
| 7,143,373 B2 | 11/2006 | Moorby |
| 8,234,617 B2 | 7/2012 | Chetput et al. |
| 8,341,570 B2 | 12/2012 | Jain et al. |
| 8,554,530 B1 | 10/2013 | O' et al. |
| 8,849,644 B2 | 9/2014 | Tan et al. |
| 9,009,653 B2 | 4/2015 | Padmalata et al. |
| 9,026,961 B2 | 5/2015 | Chan |
| 9,684,744 B2 | 6/2017 | Geller et al. |
| 2006/0075367 A1 | 4/2006 | Chan |
| 2018/0107825 A1 | 4/2018 | Darbari |

OTHER PUBLICATIONS

Clifford E. Cummings, et al., "System Verilog Event Regions, Race Avoidance & Guidelines", 2006; https://www.google.com/url?sa=t&rct=j&q=&esrc=s&source=web&cd=2&ved=2ahUKEwiUgb30ravkAhUBWqwKHbpvChcQFjABegQIABAC&url=http%3A%2F%2Fwww.sunburst-design.com%2Fpapers%2FCummingsSNUG2006Boston_SystemVerilog_Events.pdf&usg=AOvVaw1m86urOSAU7aTiXsldij-l.

*Primary Examiner* — Mohammed Alam
(74) *Attorney, Agent, or Firm* — Tarolli, Sundheim, Covell & Tummino LLP

(57) ABSTRACT

A logic simulation electronic design automation (EDA) application, the logic can be configured to receive a circuit design of an integrated circuit (IC) chip, the circuit design comprising an imported module comprising a list of simple immediate assertions (SIAs) for the imported module, wherein the circuit design comprises a first power domain and a second power domain, wherein the first power domain controls a power state of the second power domain and the imported module is assigned to the second power domain. The logic simulation EDA application can be configured to convert, in response to user input, each SIA in the list of SIAs into a respective hybrid deferred assertion (HDA) to form a list of HDAs for the imported module and execute a simulation of the IC chip, and execution of the simulation can include execution of a plurality of time slots for a plurality of simulation cycles.

20 Claims, 9 Drawing Sheets

HYBRID DEFERRED ASSERTION FOR CIRCUIT DESIGN

TECHNICAL FIELD

This disclosure relates to electronic design automation (EDA) applications. More particularly, this disclosure relates to an EDA application that can convert a simple immediate assertion (SIA) into a hybrid deferred assertion (HDA).

BACKGROUND

An Electronic design automation (EDA) application, also referred to as electronic computer-aided design (ECAD), is a category of software applications for designing electronic systems such as integrated circuits and printed circuit boards. The applications work together in a design flow that chip designers use to design and analyze entire semiconductor chips. Since modern semiconductor chips can have billions of components, EDA applications are essential for their design. As one example, EDA applications can include logic synthesis, logic simulation and formal verification.

SystemVerilog, standardized as IEEE 1800, is a hardware description and hardware verification language used to model, design, simulate, test and implement electronic systems. SystemVerilog is based on Verilog and some extensions, and since 2008 Verilog is now part of the same IEEE standard. SystemVerilog is commonly used in the semiconductor and electronic design industry as an evolution of Verilog.

Logic simulation is the use of simulation software (a particular EDA application) to predict the behavior of digital circuits and hardware description languages (HDLs). Simulation can be performed at varying degrees of physical abstraction, such as at the transistor level, gate level, the RTL, electronic system-level (ESL), or behavioral level.

An assertion is an instruction to a verification tool to check a property. Properties can be checked dynamically by simulators or statically by a separate property checker tool. Assertions are often used to validate the behavior of a design. ("Is the design working correctly?"). Assertions may also be used to provide functional coverage information for a design ("How good is the test?").

SUMMARY

One example relates to a non-transitory machine readable medium having machine readable instructions, the machine readable instructions includes a logic simulation electronic design automation (EDA) application. The logic simulation EDA application can be configured to receive a circuit design of an integrated circuit (IC) chip, the circuit design can include an imported module with a list of simple immediate assertions (SIAs) for the imported module. The circuit design can include a first power domain and a second power domain, and the first power domain controls a power state of the second power domain and the imported module is assigned to the second power domain. The logic simulation EDA program can be configured to convert, in response to user input, each SIA in the list of SIAs into a respective hybrid deferred assertion (HDA) to form a list of HDAs for the imported module and execute a simulation of the IC chip, wherein execution of the simulation includes execution of a plurality of simulation cycles for a plurality of time slots. Execution of a simulation cycle for a given time slot can include executing an active region set of the IC chip, wherein execution of the active region set includes evaluating each HDA in the list of HDAs and recording results of each evaluation of each HDA. Execution of the simulation cycle for given time slot can also include executing a reactive region set of the IC chip after execution of the active region set. Results of each evaluation of each HDA are reported during execution of the reactive region. Additionally, the results of each HDA are configured to be one of suspended and inactive in response to a change of state of the second power domain during execution of the corresponding active region set for the given time slot.

Another example relates to a method that can include receiving a circuit design of an IC chip. The circuit design can include a plurality of imported modules, and each of the plurality of imported modules can include a list of SIAs, and the circuit design includes a plurality of power domains. A first power domain in the plurality of power domains can control a power state of a subset of other power domains in the plurality of power domains and a subset of imported modules of the plurality of imported modules is assigned to a given power domain of the other power domains. The method can also include selecting by a logic simulation EDA application the subset of the imported modules in response to user input and converting, in response to user input, each SIA in the list of SIAs for each selected module in the subset of imported modules into a respective HDA to form a list of HDAs for each imported module in the subset of imported modules. The method can still further include executing, by the logic simulation EDA application, a simulation of the IC chip, wherein execution of the simulation includes execution of a plurality of simulation cycles for a plurality of time slots. Execution of a simulation cycle for a given time slot can include executing an active region set for the circuit design, and execution of the active region set can include evaluating each HDA in the list of HDAs for the subset of imported modules and recording results of each evaluation of each HDA. Execution of the simulation cycle for the given time slot can also include executing a reactive region set of the IC chip after execution of the active region set, and results of each evaluation of each HDA for the subset of imported modules are reported during execution of the reactive region. The results of each HDA are configured to be one of suspended or inactive in response to a change of a power state of the given power domain during execution of the corresponding active region set for the given time slot.

Yet another example relates to a system that can include a non-transitory memory to store machine readable instructions and a processor to access the memory and execute the machine readable instructions. The machine readable instructions can include a logic simulation EDA application, the logic simulation EDA application can be configured to receive a circuit design of an IC chip. The circuit design can include an imported module including a list of SIAs for the imported module. The circuit design can include a first power domain and a second power domain, the first power domain can control a power state of the second power domain and the imported module is assigned to the second power domain. The logic simulation EDA application can be configured to convert, in response to user input, each SIA in the list of SIAs into a respective HDA to form a list of HDAs for the imported module. The logic simulation EDA application can further be configured to execute a simulation of the IC chip, wherein execution of the simulation includes execution of a plurality of simulation cycles for a plurality of time slots. Execution of a simulation cycle for given time slot can include executing an active region set of the IC chip, wherein execution of the active region set includes evaluating each HDA in the list of HDAs and recording results of each evaluation of each HDA. Execution of the simulation cycle for the given time slot can also include executing a reactive region set of the IC chip after execution of the active region set. Results of each evaluation of each HDA are reported during execution of the reactive region and the results of each HDA are configured to be one of suspended or inactive in response to a change of state of the second power domain during execution of the corresponding active region set for the given time slot.

DETAILED DESCRIPTION

This disclosure relates to systems and methods for executing a simulation of a circuit design with an imported module (or multiple imported modules), such as a design for an integrated circuit (IC) chip prepared on an electronic design automation (EDA) application. Each imported module (or some subset thereof) can include a list of properties for the respective module, wherein the list of properties defines a set of assertions for the respective module. The set of assertions can include simple immediate assertions (SIAs) and observed deferred assertions (ODAs).

Prior to executing the simulation of the circuit design, a user of the EDA application is provided with the option of converting SIAs of the imported module into corresponding hybrid deferred assertions (HDAs). The user may elect to convert each SIA for the imported module (or multiple imported modules) into a corresponding HDA. During the simulation, each HDA is configured/programmed to record each state change of the assertion during an active region set of a simulation cycle, but defer (delay) reporting of the state changes during a reactive region set of the simulation cycle, which occurs after the active region of the simulation cycle has ended. Moreover, each HDA is configured/programmed such that if a power state of the corresponding module changes during the active region set of the simulation cycle, the HDA reports the results as suspended in the active region set and inactive after the reactive region set. By converting SIAs into HDAs, low power circuit designs (e.g., circuit designs with multiple power domains) can avoid race conditions between power state changes and assertions that would otherwise provide erroneous and/or extraneous information regarding the associated imported module.

Figure 1:
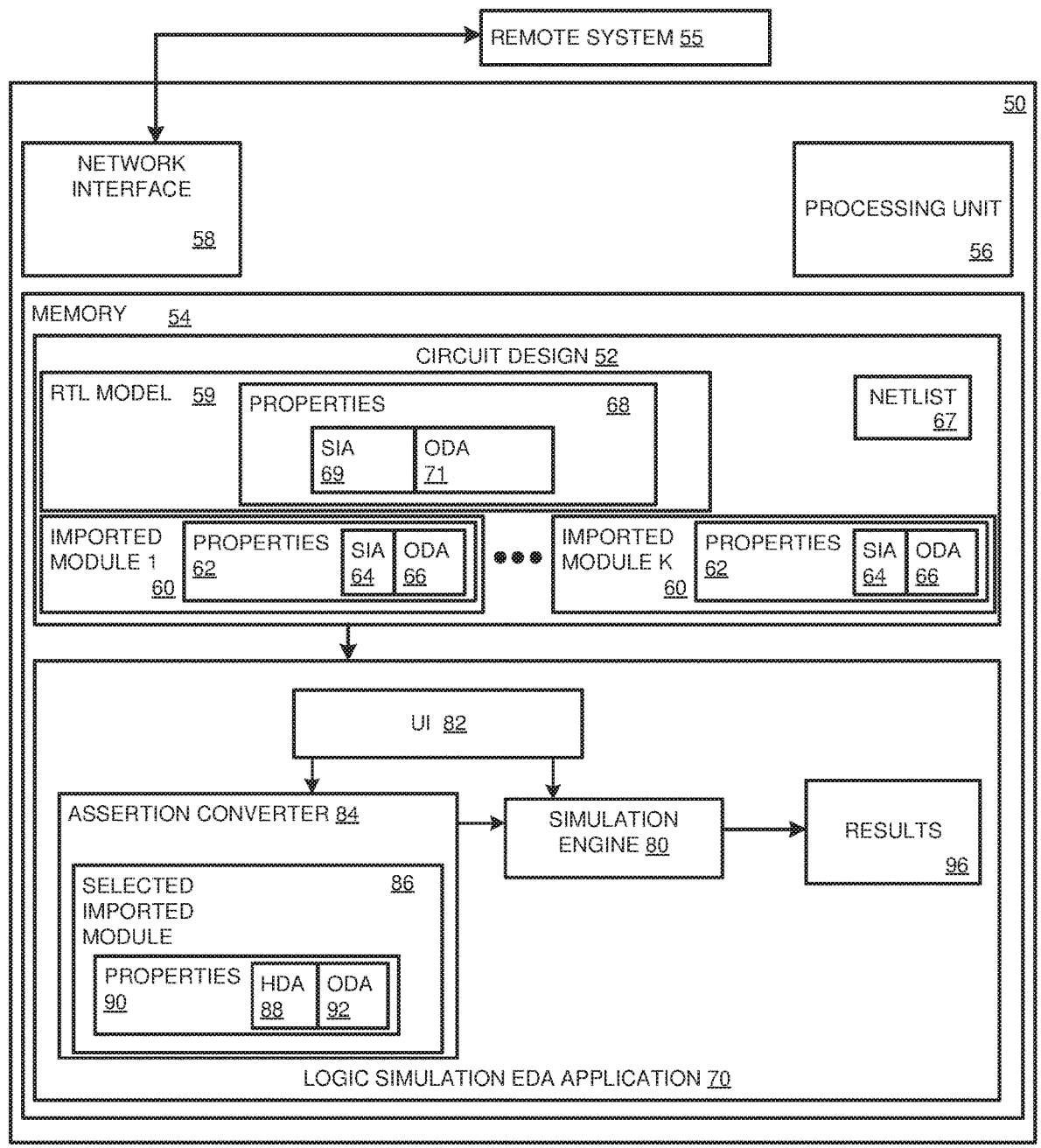
FIG. 1 illustrates an example of a system for executing a simulation of a circuit design.

FIG. 1 illustrates an example of a system 50 for simulating operation of a circuit design 52. The system 50 can represent a computing platform. Accordingly, the system 50 can include a memory 54 for storing machined readable instructions and data and a processing unit 56 for accessing the memory 54 and executing the machine readable instructions. The memory 54 represents a non-transitory machine readable memory, such as random access memory (RAM), a solid state drive, a hard disk drive or a combination thereof. The processing unit 56 can be implemented as one or more processor cores. The system 50 can include a network interface 58 (e.g., a network interface card) configured to communicate with other computing platforms via a network, such as a public network (e.g., the Internet), a private network (e.g., a local area network) or a combination thereof (e.g., a virtual private network).

The system 50 could be implemented in a computing cloud. In such a situation, features of the computing platform, such as the processing unit 56, the network interface 58, and the memory 54 could be representative of a single instance of hardware or multiple instances of hardware with applications executing across the multiple of instances (i.e., distributed) of hardware (e.g., computers, routers, memory, processors, or a combination thereof). Alternatively, the system 50 could be implemented on a single dedicated server or workstation.

The circuit design 52 can be stored in the memory 54. The circuit design 52 can be implemented, for example, as design specifications for an integrated circuit (IC) chip. The circuit design 52 can be generated with an electronic design automation (EDA) application, such as a logic synthesis application (e.g., a synthesis tool). In such a situation, an end-user of a remote system 55 can employ a user-interface to generate and/or modify hardware description language (HDL) code (e.g., Verilog) for generating a resistor-transfer level (RTL) model 59 (e.g., RTL code) characterizing a circuit.

The circuit design 52 can include K number of imported modules 60, where K is an integer greater than or equal to one (1). Each imported module 60 can be implemented as a semiconductor intellectual property (IP) block, which may alternatively be referred to as an IP core. Each of the K number of imported modules 60 can be implemented as a reusable unit of logic, a cell or an IC chip layout design that is the IP of a party. In some examples, each imported module 60 (or some subset thereof) can be licensed to another party or can be owned and used by a single party alone. Thus, some or all of the K number of imported modules 60 may include subject matter that is subject to patent and/or source code copyright. The K number of imported modules 60 are employable as building blocks within the circuit design 52. Moreover, in some examples, the RTL model 59 can include logic for integrating the K number of imported modules 60.

Each of the K number of imported modules 60 can include a set of properties 62. The properties 62 associated with the imported modules 60 can include a set of simple immediate assertions (SIAs) 64 and a set of observed deferred assertions (ODAs) 66. An assertion (an SIA or an ODA) is a predicate (a Boolean-valued function over the state space, which may be expressed as a logical proposition using the variables of a program) connected to a point in the corresponding imported module 60, that always should evaluate to true at that point in code execution. Assertions can help a circuit designer examine the logic of the imported module K, and help a logic synthesis EDA application compile the imported module. Moreover, in the examples described herein, an SIA refers to an assertion which is evaluated and reported immediately in an active region set of a simulation cycle. Conversely, an ODA refers to an assertion that is evaluated during the active region set of the simulation cycle, and reported during a reactive region set of the simulation cycle, wherein the ODA reports a state of the associated assertion at the end of the active region set of the simulation cycle. Similarly, the RTL model 59 can also include a list of properties 62 that includes a set of SIAs 64 and a set of ODAs 66 that are associated with the logic present in the RTL model 59.

In the present example, it is presumed that the circuit design 52 is a low power circuit design. As used herein, the term "low power circuit design" indicates that the circuit design 52 has multiple power domains with a controllable power state. At least some of the power domains are activated or deactivated in a non-deterministic manner. In a first example (hereinafter, "the first example), the circuit design 52 is intended to be deployed on a mobile device (e.g., a tablet computer or a smartphone) powered by a battery. In the first example, a first imported module 60 is related to operations of a global positioning system (GPS), a second imported module 60 is related to operations of a graphical processing unit (GPU) and a third imported module 60 is related to operations of voice communications. In the first example, it is presumed that there is a parent power domain that is formed with logic in the RTL model 59 that can activate and deactivate child power domains. Moreover, it is presumed that the first imported module 60 is associated with a first child power domain, the second imported module 60 is associated with a second child power domain and the third imported module 60 is associated with a third child power domain.

Continuing with the first example, the RTL model 59 can include logic for activating and deactivating the first child power domain, the second child power domain and the third child power domain. For instance, in the first example to conserve power, the first power domain associated with the first imported module 60 (related to GPS operations) may be activated and deactivated based on a need for location information. Similarly, to further conserve power, the second power domain associated with the second imported module 60 (related to GPU operations) may be activated and deactivated based on a need for dynamic graphical output. Further still to conserve power, the third power domain associated with the third imported module 60 (related to voice communications) may be activated and deactivated based on a communication state of the mobile device.

Continuing with the first example, in a situation where an end-user is employing the mobile device to conduct voice communication, the third power domain may be activated, but the first power domain (related to GPS operations) and the second power domain (related to GPU operations) may be deactivated. Thus, the RTL model 59 can include logic for activating the third power domain and deactivating the first power domain and the second power domain in response to receiving a request for voice communications (e.g., an incoming or outgoing voice call). In such a situation, activation and deactivation of the first power domain, the second power domain and the third power domain are inherently non-deterministic, since operations such as incoming and outgoing voice calls are non-deterministic in nature.

Each of the imported modules 60 can be designed to be agnostic to the context of the power domain. That is, there is no requirement that the designer of a given imported module 60 have any knowledge that the given imported module 60 will be used in a lower power circuit design.

The RTL model 59 and the K number of imported modules 60 are transformable by an EDA (e.g., a logic synthesis application) into a physically realizable gate-level netlist 67 for the circuit design 52. The RTL model 59 can include a list of properties 68 that includes a list of SIAs 69 and a list of ODAs 71.

The circuit design 52 can be provided to a logic simulation EDA application 70 that simulates operating a circuit corresponding to the circuit design 52. The logic simulation EDA application 70 includes a user interface (UI) 82, such as a graphical user interface (GUI) that can allow a user to set parameters and initiate a simulation of the circuit design 52.

Additionally, the logic simulation EDA application 70 can include an assertion converter 84. The UI 82 can output visual indicia (e.g., radio buttons, check boxes, etc.) to allow selection of the K number of imported modules 60 (or some subset thereof) of the circuit design 52 for assertion conversion. Each of the K number of selected imported modules 60 can be provided to the assertion converter 84. The assertion converter 84 can parse each selected imported module 86 (only one of which is illustrated) to convert each SIA 64 of the corresponding imported module 60 into an HDA 88. Accordingly, each selected imported module 86 includes a list of properties 90 that includes a set of HDAs 88 and ODAs 92, wherein the ODAs are unchanged from the corresponding imported module 60.

The UI 82 also provides the user with an option (e.g., a virtual button) to actuate simulation of the circuit design 52. Upon selection of the simulation option, the circuit design 52 and the selected imported modules 86 are provided to a simulation engine 80 that simulates operation of the circuit and outputs results 96. In some examples, the UI 82 can output the results 96 on a display.

To execute the simulation, the simulation engine 80 executes multiple simulation cycles, wherein each simulation cycle represents a time slot of operation of the circuit corresponding to the circuit design 52. As used herein, the term "time slot" refers to simulation activity that is processed in event regions for each simulation time. Additionally, the term "simulation time" refers to a time value maintained by the simulation engine 80 to model the actual time that it would take for a circuit fabricated with the circuit design 52 to operate. Simulation activity for a particular simulation time is executed until no further simulation activity remains for the corresponding time slot without advancing the simulation time. Additionally, it is understood that execution of simulation events within a time slot may include execution of multiple iterations of simulation event regions for the same time slot.

Each time slot includes events in an active region set and events in an reactive region set. The simulation engine 80 is configured to analyze each HDA 88 of the selected import modules 86 during the active region set of a time slot and to report the results of the HDA during the reactive region set. In the disclosure, each HDA, is configured such that if a power domain associated with the HDA is deactivated during an active region of a time slot, the assertions for that time slot are reported as being suspended. Additionally, in the present disclosure, each HDA is configured such that if a power domain associated with the HDA is activated during an active region set of a time slot the assertions for that time slot reported as being inactive. Accordingly, in the present disclosure, each HDA is reported as being suspended or inactive if a power state of the power domain associated with the HDA changes (e.g., activated or deactivated) during a given time slot. Conversely, as explained in detail herein, if the power domain associated with the HDA remains activated during the active region set of the time slot, the assertion is evaluated (e.g., finished/fail) and recorded during the active region set and reported during the reactive region set. Further, if the power state of the power domain changes during the reactive region set, the results of the assertion are reported prior to changing the power state in the reactive region set.

Figure 2:
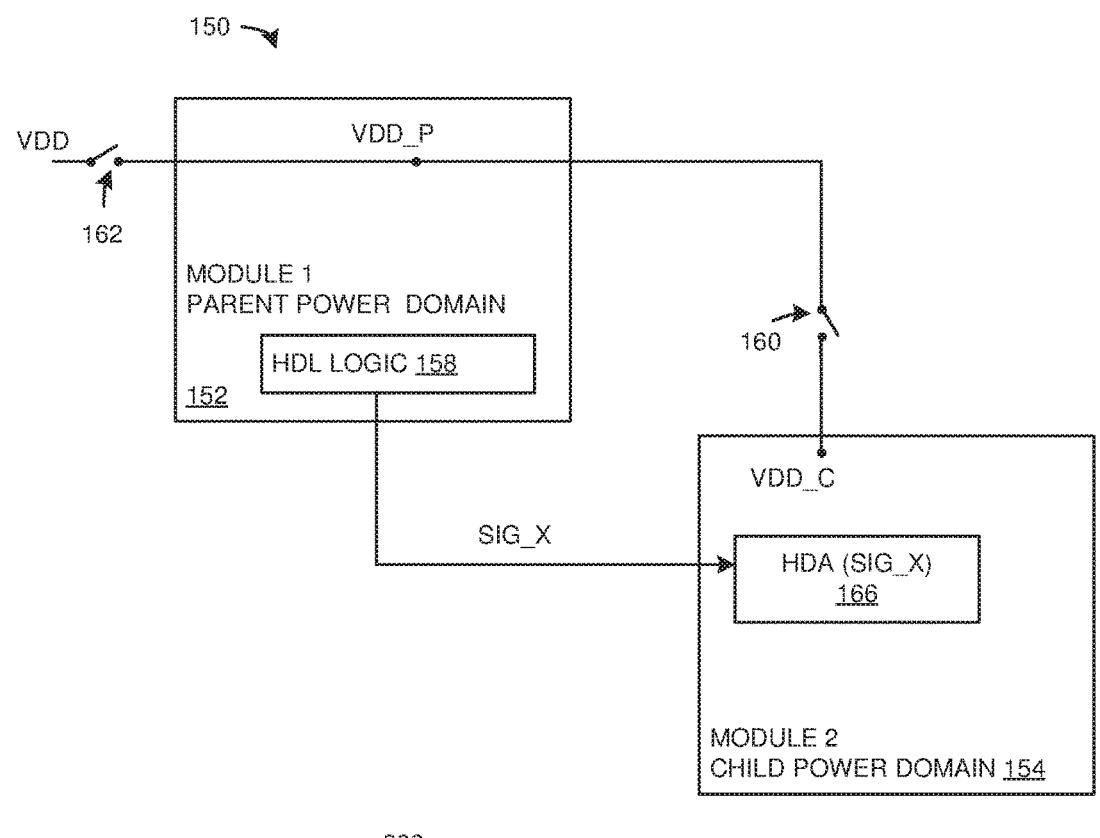
FIG. 2 illustrates a diagram of a circuit with multiple power domains.
Figure 2:
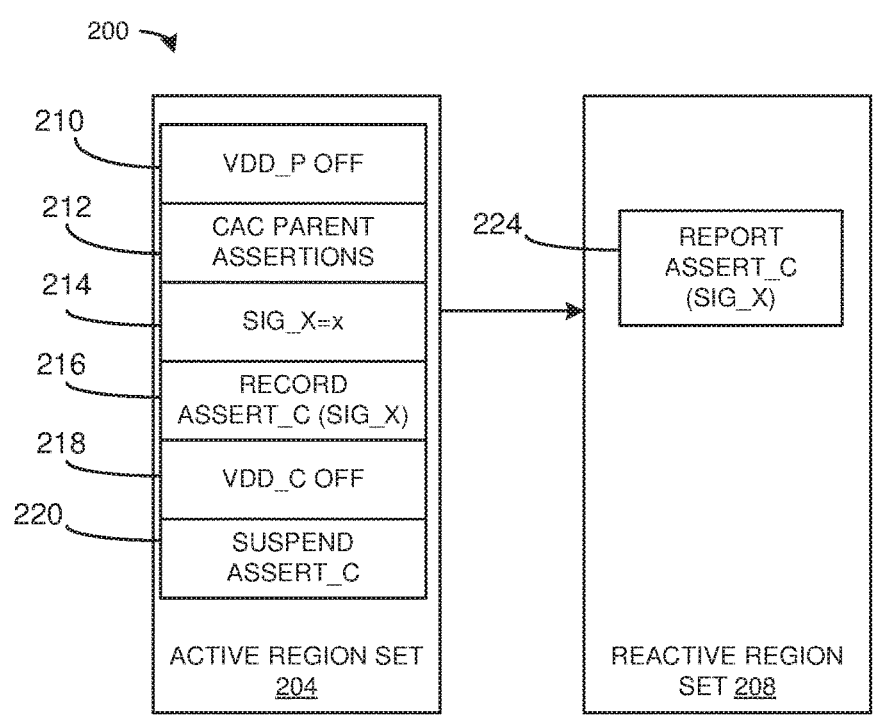

FIG. 2 illustrates a diagram 150 of a circuit that illustrates conceptual example demonstrating interpretation of an HDA for a particular selected imported module in a second example (hereinafter, "the second example"). The diagram 150 includes a first module 152 (module 1) and a second module 154 (module 2). The first module 152 can be implemented on a parent power domain, represented as VDD_P, and the second module 154 can be implemented on a child power domain, represented as VDD_C. It is presumed that in the example illustrated by FIG. 2, SIAs for the first module 152 have not been converted to HDAs, and SIAs for the second module 154 have been converted into HDAs.

The first module 152 can include HDL logic 158 that can activate and deactivate the child power domain, wherein activation and deactivation can be represented by a state of a switch 160. Stated differently, the first module 152 can change the power state of the child power domain that is employed to power the second module 154. Similarly, the parent power domain for the first module 152 can be activated and deactivated by a master power domain represented as VDD, wherein activation and deactivation of the parent power domain, VDD_P is represented by a switch 162.

The HDL logic 158 can generate a signal, SIG_X that is employable by the second module 154 to execute an HDA 166. For purposes of simplification of explanation, in the second example, it is presumed that the HDA 166 is an evaluation of the value of the signal, SIG_X.

FIG. 2 also includes a flowchart 200 that depicts operations of the diagram 150 during execution of a simulation of a given time slot. The flowchart includes an active region set 204 and a reactive region set 208. The active region set 204 includes a list of operations (events) executed during an active region of the given time slot and the reactive region set 208 includes a list of operations (events) executed in a reactive region of the given time slot.

The active region set 204 includes a first operation 210, labeled "VDD_P OFF", which causes the switch 162 of the diagram 150 to open, thereby deactivating the parent power domain. The active region set 204 also includes a second operation 212 labeled "CAC PARENT ASSERTIONS" where assertions (if any) in the first module 152 are suspended. The active region set 204 includes a third operation 214, labeled "SIG_X=x", which causes the signal, SIG_X to be set to a value of logical x. The active region set 204 includes a fourth operation 216, labeled "RECORD ASSERT_C (SIG_X)", wherein the results of the assertion evaluated by the HDA 166 are recorded. The active region set 204 includes a fifth operation 218, labeled "VDD_C OFF", which causes the switch 160 to open. The active region set 204 includes a sixth operation 220, labeled "SUSPEND ASSERT_C", which causes assertions in the child power domain to be suspended.

During simulation, some events in the active region set 204 are executed non-deterministically. For example, during some simulations of a circuit represented by the diagram 150, the order of operations the fourth operation ("RECORD ASSERT_C (SIG_X)"), the fifth operation (VDD_C OFF) may occur in any order. Accordingly, the value of the assertions of in the child power domain executed by the second module 154 may have different results based on the actual order in which the events in the active region set 204 are executed. Therefore, reporting of the results of the HDAs in the active region set 204 are deferred until the reactive region set 208.

The reactive region set 208 includes an operation 224, labeled REPORT ASSERT_C (SIG_X). In the present disclosure, each HDA, including the HDA 166 in the diagram 150 is configured such that if a power domain associated with the assertion is deactivated during an active region set of a time slot, the assertions for that time slot are reported as being suspended independent of evaluation results during the active region set. Additionally, in the present disclosure, each HDA, including the HDA 166 in the diagram 150 is configured such that if a power domain associated with the assertion is activated during the active region set of a time slot, that the assertions for that time slot is reported as being inactive. Accordingly, in the present disclosure, each HDA is reported as suspended or inactive if the power domain associated with the HDA changes during an active region set of a given time slot. Conversely, as explained herein, if the power domain associated with the HDA remains active during the active region for the given time slot, the HDA is evaluated (e.g., finished/fail) and reported during the reactive region set (e.g., the reactive region set 208) of the given time slot. Additionally, in some examples multiple evaluations of the HDA are recorded during the active region set (e.g., the active region set 204) of the given time slot and each evaluation is reported during the reactive region set (e.g., the reactive region set 208) for the given time slot. Thus, in the present example, multiple states for the HDA 166 may be reported during the reactive region set 208. Further still, in situations where the power state of the power domain for an HDA changes during the reactive region set (e.g., the reactive region set 208) the results of the evaluation during the active region set (e.g., the active region set 204) are reported prior to suspending the results of the HDA.

Referring back to FIG. 1, by selectively converting SIAs into HDAs for particular imported modules 60, erroneous failed assertions due to race conditions within a particular time slot between assertions and power domain state changes (e.g., activations/deactivations) can be avoided. In this manner, a user (a chip designer) is unburdened with reviewing/revising the imported modules 60 to account for such erroneous failed assertions.

Figure 3:
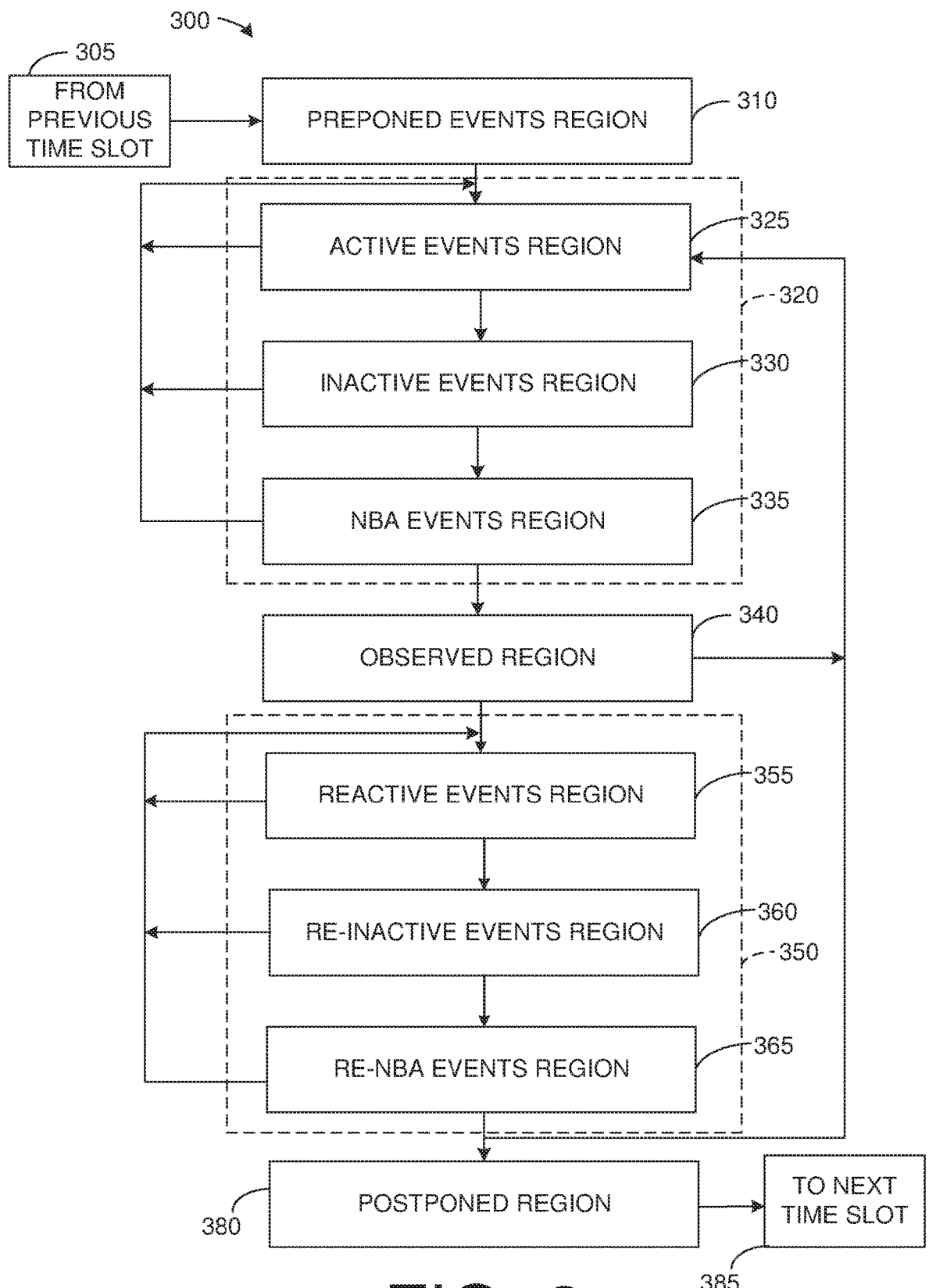
FIG. 3 illustrates a flowchart of an example method for executing a simulation cycle for a time slot of a simulation of a circuit design.

FIG. 3 illustrates a flowchart of an example method 300 for executing a simulation of a circuit design that uses SystemVerilog for a given time slot. The method 300 can be executed, for example, by the logic simulation EDA application 70 on the circuit design 52 of FIG. 1. In the example illustrated by the method 300, it is presumed that a given SIA for an imported module has been converted into a given HDA for the imported module (e.g., one of the imported modules 60 of FIG. 1).

The method 300 begins at 305, during which the logic simulation EDA application advances from a simulation cycle for a previous time lot for a circuit design (e.g., the circuit design 52 of FIG. 1) to a given time slot. At 310, the logic simulation EDA application executes preponed events. Preponed events include sampling values that are employed by concurrent assertions. The preponed events executed at 310 are executed once during the given time slot.

Upon completing the preponed events at 310, the logic simulation EDA application advances to operations in an active region set 320. Operations in the active region set 320 are employed to schedule blocking assignments and non-blocking blocking assignments (NBAs) included in module code.

During the active region set 320, at 325, the logic simulation EDA application executes an active events region, which is alternatively referred to as an active region. The active region includes (i) executing module blocking assignments, (ii) evaluating the Right-Hand-Side (RHS) of NBAs and schedule updates into an NBA region (iii) evaluate module continuous assignments (iv) evaluate inputs and update output of HDL (e.g., SystemVerilog) primitives and (v) execute display and finish commands. More particularly, during execution of the active region at 325, SIAs on modules of the circuit design are evaluated and reported, and ODAs are evaluated, but not yet reported. Further, during the active region at 325, the logic simulation EDA application executes assertion control at a start of the active region. Further still, in the active region at 325 the given HDA is evaluated (but not reported). More particularly, a subroutine of the given HDA is sampled at the time of evaluation. It is noted that the operations in the active region can occur in any order since some (or all) of the operations may represent parallel operations in a circuit fabricated based on the circuit design. Additionally, at 325, some or all of the operations at 325 can be repeated, such that the method returns to 325. Alternatively, the method 300 can advance to 330.

At 330, continuing with the active region set 320, the logic simulation EDA application executes an inactive events region, which is alternatively referred to as an inactive region. During the inaction region particular blocking assignments, namely, #0 blocking assignments are scheduled. Additionally, at 330, some or all of the operations at 325 can be repeated, such that the method 300 returns to 325. Alternatively, the method 300 can advance to 335.

At 335, continuing with the active region set 320, the logic simulation EDA application executes an NBAs event region, which is alternatively referred to as an NBA region. In the NBA events region, the logic simulation EDA application executes update to the Left-Hand-Side (LHS) variables that were scheduled in the active region at 325. Additionally, at 335, some or all of the operations at 325 can be repeated, such that the method 300 returns to 325. Alternatively, the method 300 can complete the active region set 320 and advance to 340.

At 340, the logic simulation EDA application executes an observed region. In the observed region, concurrent assertions using values sampled in the preponed events region at 310 are evaluated. Additionally, upon completion of the observed region 340, some or all of the operations at 325 can be repeated, such that the method 300 returns to 325. Alternatively, the method 300 can advance to a reactive region set at 350.

Operations in the reactive region set 350 are employed to schedule blocking assignments, #0 blocking assignments and NBAs included in program code. Operations called from a program are also schedule in the reactive event region set 350. The reactive region set can be employed to schedule testbench stimulus drivers and testbench verification checking in the given time slot after RTL code has settled to a semi-steady state.

During the reactive region set 350, at 355, the logic simulation EDA application executes a reactive events region, which is alternatively referred to as a reactive region. The active region includes (i) executing program blocking assignments, (ii) execute pass/fail code from concurrent assertions (iii) evaluating the Right-Hand-Side (RHS) of program NBAs and schedule updates into a Re-NBA region (iv) program continuous assignments and (iv) execute exit commands. More particularly, during execution of the reactive region at 350, ODAs that were evaluated in the active region at 325 are reported. Further, during the reactive region at 350, the logic simulation EDA application executes assertion control at the start of the reactive region. The ODAs are reported based on a final execution of the corresponding ODA. Further still, in the reactive region at 355 the given HDA is reported. Additionally, at 355, some or all of the operations at 355 can be repeated, such that the method 300 returns to 355. Alternatively, the method 300 can advance to 360.

At 360, continuing with the reactive region set 350, the logic simulation EDA application executes a re-inactive events region, which is alternatively referred to as a re-inactive region. The re-inactive region iterates with the reactive region at 355 until each reactive/re-inactive event has been completed. Upon completion, within the given time slot, RTL regions re-trigger if program execution scheduled any events within the given time slot. Events can be scheduled into the re-inactive region with a #0 in a program process. Additionally, at 360, some or all of the operations at 355 can be repeated, such that the method 300 returns to 355. Alternatively, the method 300 can advance to 365.

At 365, continuing with the reactive region set 350, the logic simulation EDA application executes a Re-NBAs event region, which is alternatively referred as a Re-NBA region. In the Re-NBA events region, the logic simulation EDA application executes updates to the Left-Hand-Side (LHS) variables that were scheduled in the reactive region at 355. Additionally, at 365, some or all of the operations at 355 can be repeated, such that the method 300 returns to 355. Alternatively, upon completion of the reactive region set 350, some or all of the operations at 325 (the active region) can be repeated, such that the method 300 returns to 325. Alternatively, the method 300 can advance to 380.

At 380 the logic simulation EDA application executes a postponed region. During execution of the postponed region, strobe and monitor commands that show final updated values for the given time slot are executed. Postponed events are also used to collect functional coverage for items that employ strobe sampling. Upon completion of the postponed region events, the method proceeds to 385. At 385, the logic simulation EDA application program advances the time slot from the given time slot to the next time slot, such that another instance of the method 300 can be executed on the next time slot.

FIGS. 4-7 illustrate signal diagrams (e.g., timing diagrams) of assertions evaluated during a time slot of a simulation of a circuit design (e.g., the circuit design 52 of FIG. 1). For purposes of simplification of explanation, the same terms are used in FIGS. 4-7. In FIGS. 4-7, a text box 400 includes three (3) different assertions, an SIA (simple immediate assertion) 402, an ODA (observed deferred assertion) 404 and an HDA (hybrid deferred assertion) 406 that are each evaluating the same signal, namely, signal "SIG".

As noted, the signals evaluated in FIGS. 4-7 each represent one (1) time slot of a simulation cycle. Accordingly, FIGS. 4-7 include a labeled axis 410. The labeled axis 410 includes tick marks representing different event regions of the time slot, as explained with respect to FIG. 3. More specifically, the labeled axis 410 includes a preponed region, labeled "PREPONED". Additionally, the labeled axis 410 includes an active region set 412 that includes an active region, labeled "ACTIVE" an inactive region, labeled "INACTIVE" and an NBA region labeled "NBA". The labeled axis 410 includes an observed region, labeled "OBSERVED". Further, the labeled axis 410 includes a reactive region set 416 that includes a reactive region, labeled "REACTIVE", a re-inactive region labeled "RE-INACTIVE" and a re-NBA region labeled "RE-NBA".

Further still, FIGS. 4-7 each plot the same set of signals. More specifically, FIGS. 4-7 plot a power domain signal, VDD and the signal, SIG as a function of time. Similarly, FIGS. 4-7 plot states of a SIA signal, labeled "SIA" characterizing the results of the SIA 402, an ODA signal labeled "ODA" characterizing the results of the ODA 404 and an HDA signal labeled "HDA" representing the results of the HDA 406.

Figure 4:
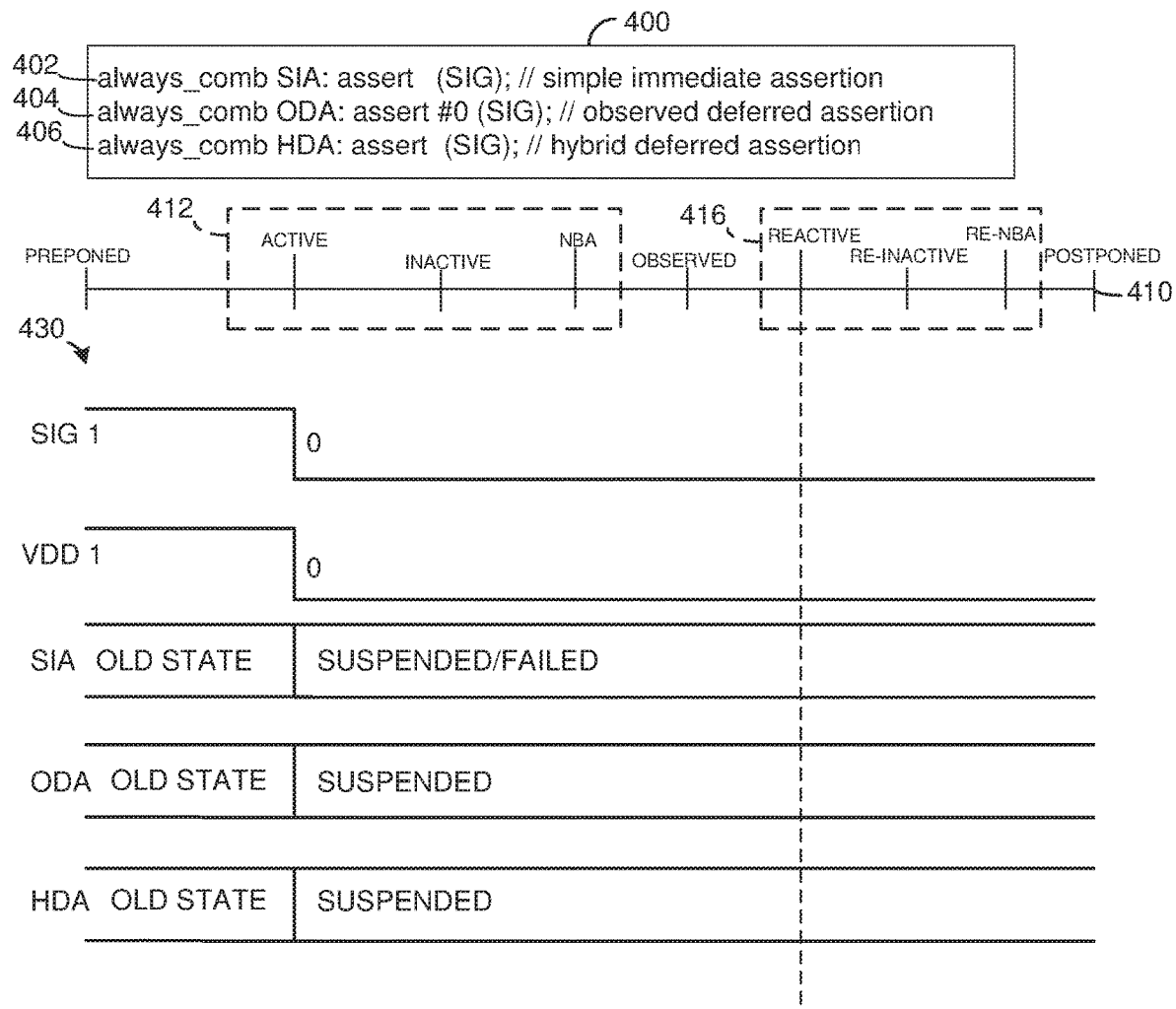
FIG. 4 illustrates a signal diagram for signals during a time slot of a simulation of a circuit design.

In the signal diagram 430 illustrated in FIG. 4, the signal, SIG and the power domain signal, VDD are initially both a logical 1, and change to a logical 0 in the active region. Additionally, as noted, operations in the active region can occur in different orders (e.g., non-deterministically). Accordingly, there is a race condition between assertion evaluation and the deactivation of the power domain signal, VDD. Thus, in some situations, the SIA may be evaluated before the power domain signal, VDD changes to logical 0 (signaling deactivation). In situations where the power domain signal, VDD changes from logical 1 to logical 0 after the signal, SIG transitions to the logical 1 and after the SIA 402 is evaluated, the SIA signal reports a failed state (labeled "FAILED"). Conversely, in situations where the power domain signal, VDD changes from logical 1 to logical 0 before the SIA 402 is evaluated, the SIA signal reports a suspended state (labeled "SUSPENDED"). Accordingly, since the change in the power domain signal, VDD and the evaluation of the SIA 402 happen non-deterministically, race conditions occur, such that the SIA signal may report an erroneous failed state in some situations.

The ODA signal defers reporting of the results of the ODA 404 to the reactive region set 416. Additionally, the ODA signal reports the state of the ODA 404 at the end of the active region. Thus, in the present situation, the ODA is reported as a suspended state (labeled "SUSPENDED") because at the end of the active region set 412, the power domain signal, VDD is a logical 0.

The HDA signal defers reporting of the results of the HDA 406 to the reactive region set 416. As explained herein each HDA, including the HDA 406 is configured/programmed to report a state of suspended if the corresponding power domain signal (e.g., VDD) is a logical 0 at the end of the active region set 412. Thus, in the signal diagram 430, the HDA reports a suspended state (labeled "SUSPENDED").

Figure 5:
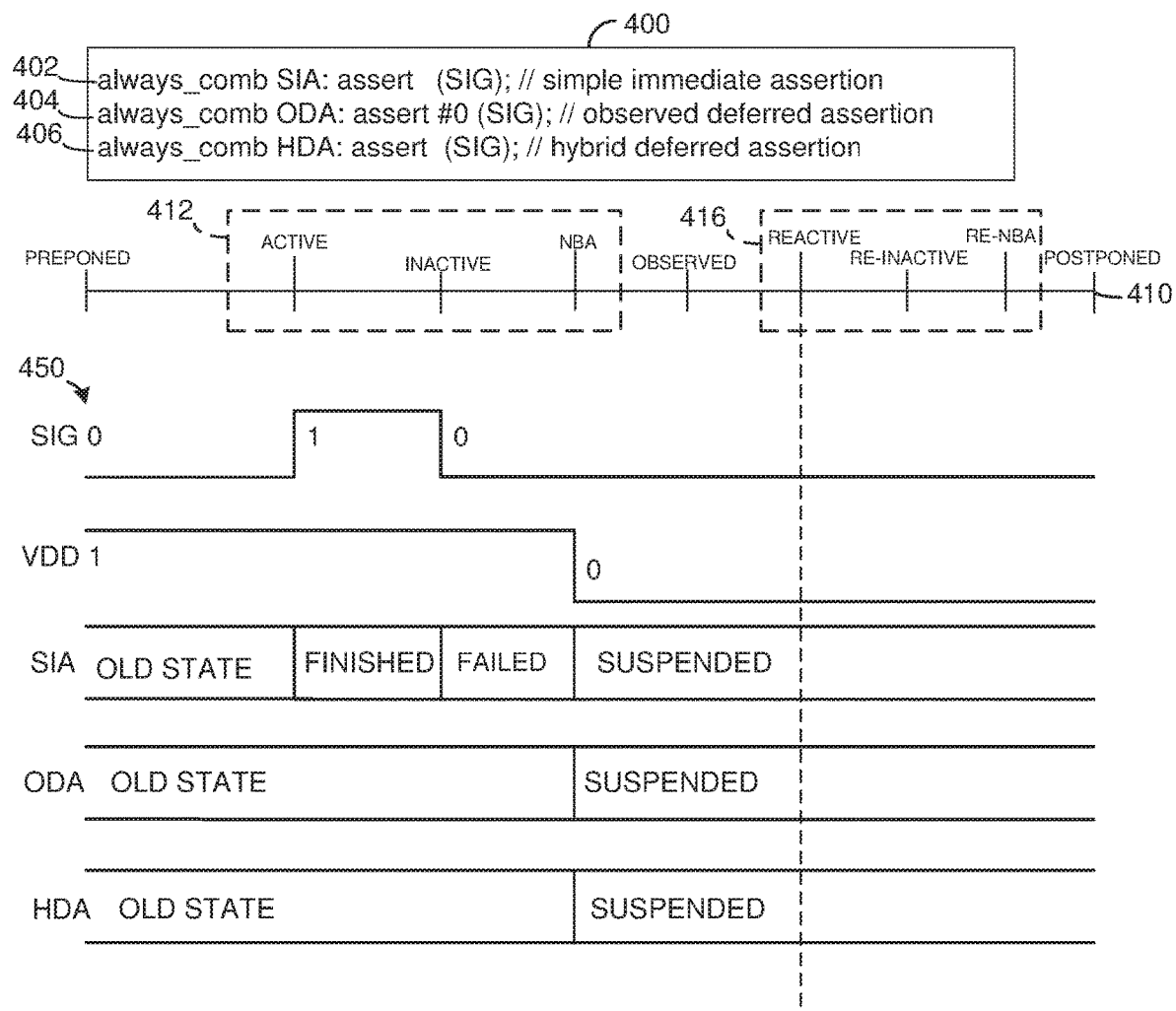
FIG. 5 illustrates another signal diagram for signals during a time slot of a simulation of a circuit design.

In the signal diagram 450 illustrated in FIG. 5, the signal, SIG is initially a logical 0 and the power domain signal, VDD is a logical 1 (indicating activated power). Additionally, during the active region, the signal, SIG is a logical 1 and then transitions to a logical 0 in the inactive region. The power domain signal, VDD transitions to a logical 0 (indicating deactivation) at the NBA region and before the reactive region set 416. Accordingly, the SIA signal remains in the previous state (labeled "OLD STATE") in the preponed region, reports to a finished (passed) state in the active region (labeled "FINISHED") and to a failed state (labeled "FAILED") in response to the signal, SIG transitioning to the logical 0 in the inactive region and then as suspended in the NBA region.

The ODA signal defers reporting of the results of the ODA 404 to the reactive region set 416. Additionally, the ODA signal reports the state of the ODA 404 at the end of the active region set 412. Thus, in the present situation, the ODA is reported as a suspended state (labeled "SUSPENDED") because at the end of the active region set 412, the power domain signal, VDD is a logical 0.

The HDA signal defers reporting of the results of the HDA 406 to the reactive region set 416. Because the HDA 406 is configured/programmed to report a state of suspended if the corresponding power domain signal (e.g., VDD) is a logical 0 at the end of the active region set 412. Thus, in the signal diagram 430, the HDA reports a suspended state (labeled "SUSPENDED").

Figure 6:
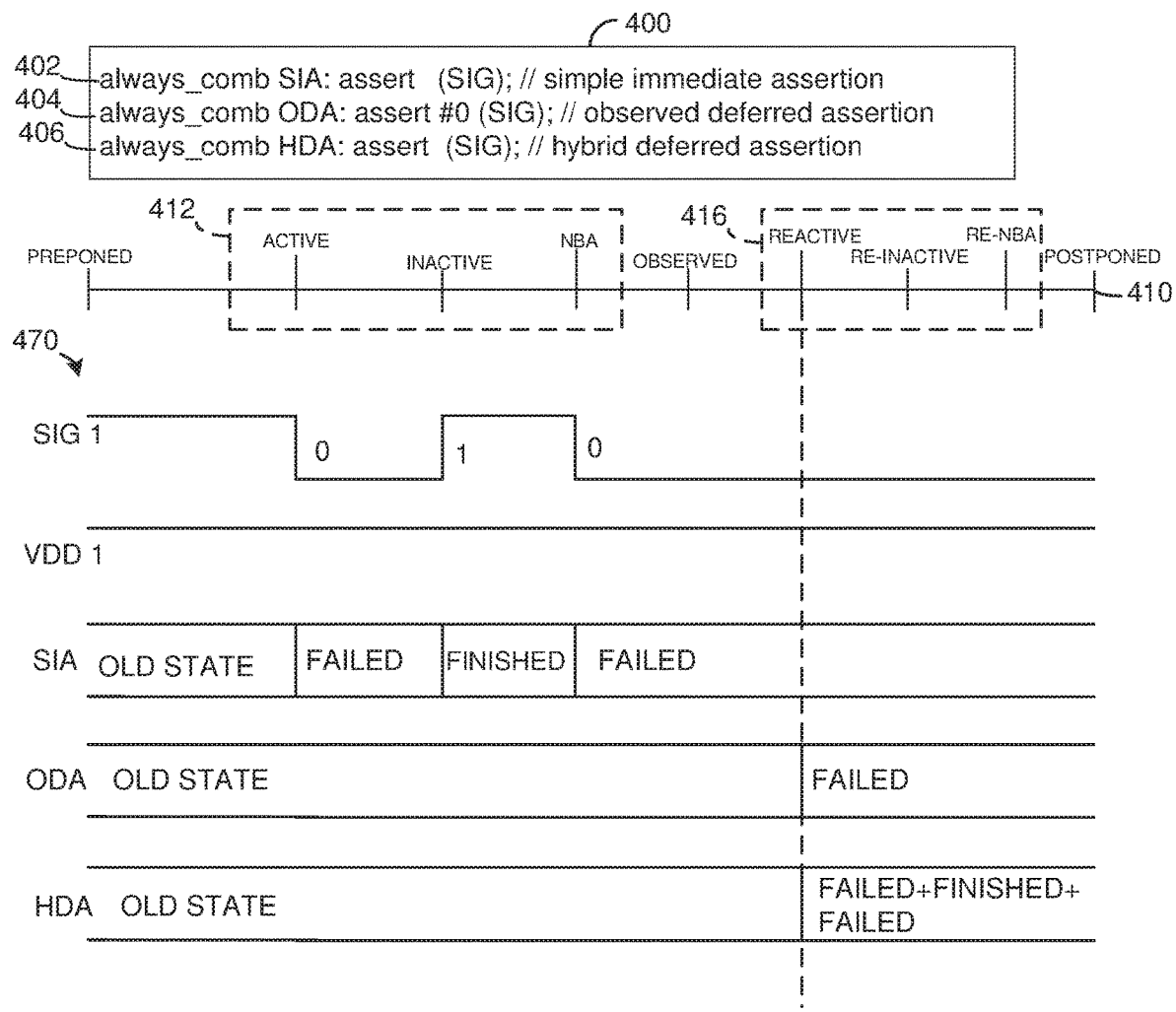
FIG. 6 illustrates yet another signal diagram for signals during a time slot of a simulation of a circuit design.

In the signal diagram 470 illustrated in FIG. 6, the signal, SIG is initially a logical 1 and the power domain signal, VDD is a logical 1 (indicating activated power). Additionally, during the active region, the signal, SIG is a logical 1 and then transitions to a logical 0 in the active region, transitions to a logical 1 in the inactive region and transitions back to a logical 0 in the NBA region. The power domain signal, VDD remains a logical 1 throughout the time slot. Accordingly, the SIA remains in the previous state (labeled "OLD STATE") in the preponed region, reports to a failed state in the active region (labeled "FAILED"), reports to a finished (passed) state (labeled "FINISHED") in response to the signal SIG transitioning to the logical 1 in the inactive region and reports to a failed state (labeled "FAILED") again in response to the signal SIG transitioning to the logical 0 in the NBA region The ODA signal defers reporting of the results of the ODA 404 to the reactive region set 416. Additionally, the ODA signal reports the state of the ODA 404 at the end of the active region set. Thus, in the present situation, the ODA signal is reported as a failed state (labeled "FAILED") because at the end of the active region set 412, the signal SIG is a logical 0.

The HDA signal is evaluated during the active region and defers reporting of the results of the HDA 406 to the reactive region set 416. Because the HDA 406 is configured/programmed to record each change in the assertion state during the active region set 412 and defer reporting of the state until the reactive region, the HDA reports three (3) states in the reactive region, namely a state of failed, finished and failed, labeled "FAILED+FINSIHED+FAILED".

Figure 7:
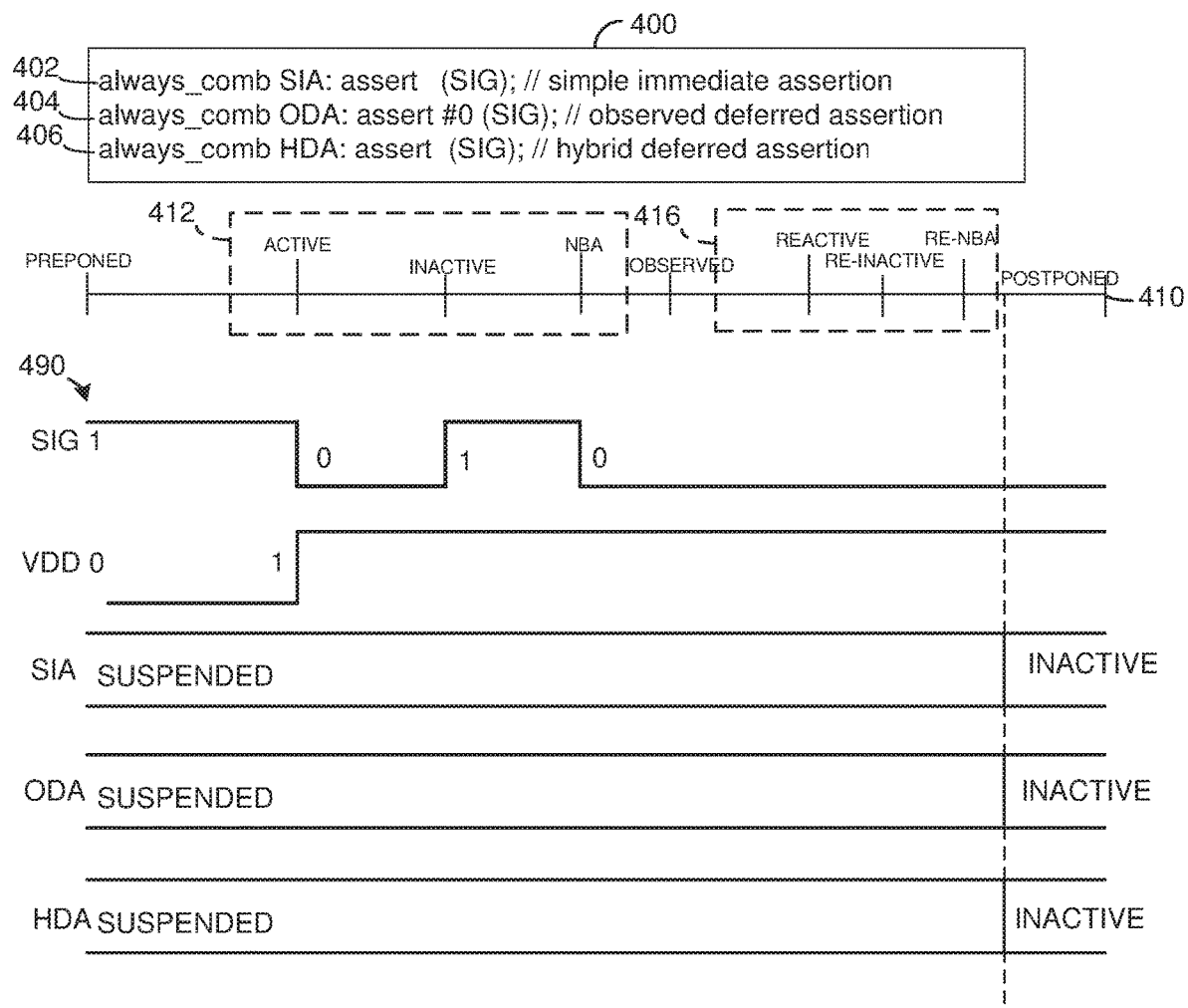
FIG. 7 illustrates still another signal diagram for signals during a time slot of a simulation of a circuit design.

In the signal diagram 490 illustrated in FIG. 7, the signal, SIG is initially a logical 0 and the power domain signal, VDD is a logical 0 (indicating deactivated power). Additionally, during the active region set 412, the signal, SIG is a logical 1 and then transitions to a logical 0 in the active region, transitions to a logical 1 in the inactive region and transitions back to a logical 0 in the NBA region. The power domain signal, VDD transitions to a logical 1 in the active region. Therefore, the logic simulation EDA application executes a control assertion command to enable evaluation of assertions during the time slot. Accordingly, the SIA, the ODA and the HDA are each reported as a being inactive (labeled "INACTIVE") after the reactive region set 416.

FIGS. 4-7 demonstrate the benefits of converting an SIA to an HDA for an imported module. For instance, in the signal diagram 430 of FIG. 4, the HDA signal avoids an erroneous reporting of a failed state that may otherwise be reported by the SIA signal due to the race condition between the power domain signal, VDD and the evaluation of the assertions. Further, as is illustrated in FIG. 5, the HDA signal for the HDA 406 avoids reporting of an erroneous failed state, in contrast to the SIA signal for the SIA 402. Additionally, in contrast to an ODA signal for the ODA 404, as illustrated in the signal diagram 470 of FIG. 6, the HDA signal reports the three (3) changes of state of the HDA 406 during the time slot. By comparison, in the signal diagram 470, the ODA signal is limited to reporting a single state, namely, a failed state. Thus, HDA signal for the HDA 406 provides more granular information than the ODA signal for the ODA 404. Summarily, as demonstrated by FIGS. 4-7, the HDA signal for the HDA 406 provides the same level of granularity as the SIA signal for the SIA 402, while avoiding erroneous failed states due to race conditions cause by changing the power state of a power domain, as indicated by changing the power domain signal, VDD.

Figure 8:
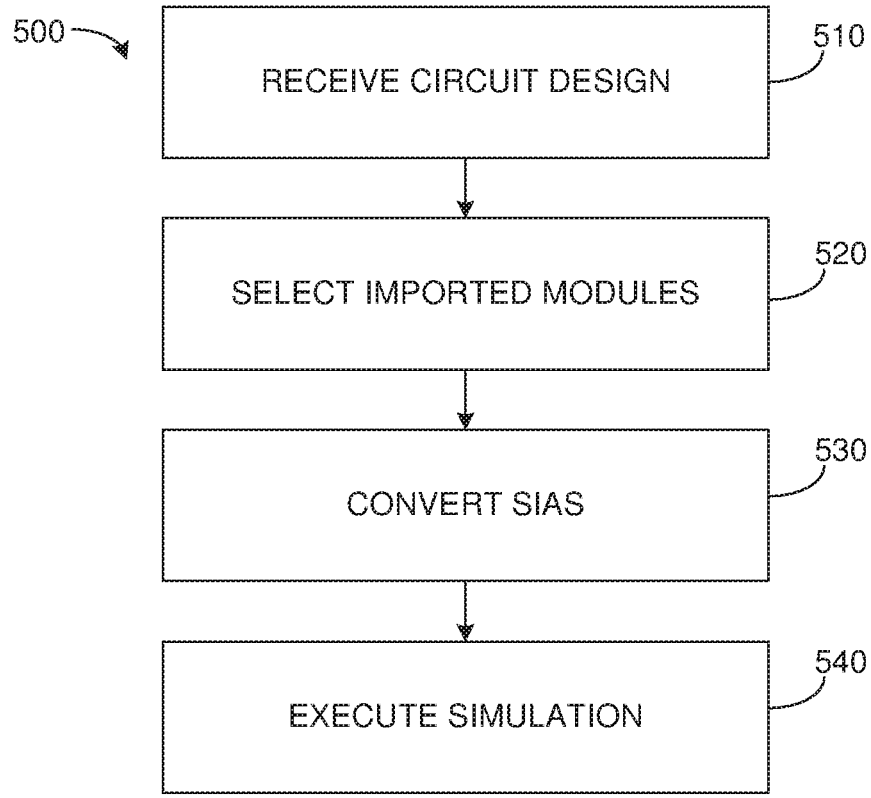
FIG. 8 illustrates a method for executing a simulation of a circuit.

FIG. 8 illustrates a simplified flowchart of an example method 500 for executing a simulation of circuit design that uses SystemVerilog for a given time slot. The method 500 can be executed, for example, by the logic simulation EDA application 70 on the circuit design 52 of FIG. 1.

At 510, the logic simulation EDA application can receive a circuit design of an IC chip, the circuit design includes a plurality of imported modules, wherein each of the plurality of imported modules can include a list of SIAs, and the circuit design can include a plurality of power domains. Further it is presumed that a first power domain of the plurality of power domains controls a subset of a power state of the other power domains and a subset of the imported modules is assigned to a given power domain of the other power domains. At 520, the EDA application can select, in response to user input (e.g., via a UI), the subset of the imported modules. At 530, the EDA application can convert, in response to user input, each SIA in the list of SIAs for each selected module in the subset of imported modules into a respective hybrid deferred assertion (HDA) to form a list of HDAs for the subset of imported modules. At 540, the logic simulation EDA application can execute a simulation of the IC chip. Execution of the simulation includes execution of simulation cycles for a plurality of time slots.

Figure 9:
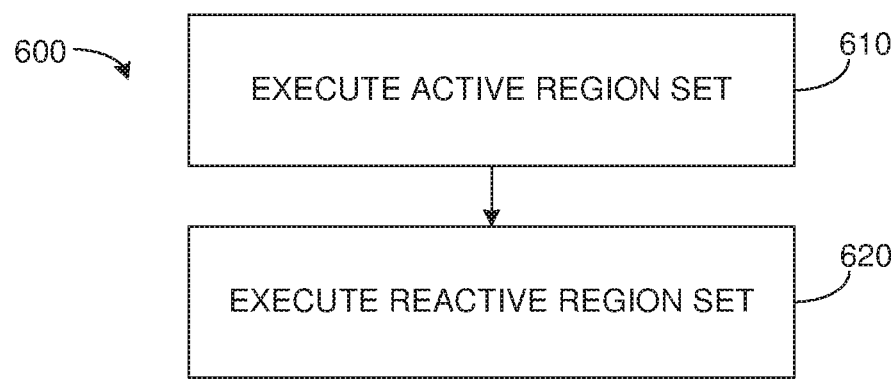
FIG. 9 illustrates a sub-method for executing a simulation cycle for a time slot of a simulation of a circuit.

Execution of each simulation cycle for a given time slot at 540 of FIG. 8 can include execution of a sub-method 600 illustrated in FIG. 9. During execution of the sub-method 600, at 610 the logic simulation EDA application can execute an active region set for the circuit design, wherein execution of the active region set includes evaluating each HDA in the list of HDAs for the subset of imported modules and recording results of each evaluation (e.g., sampling) of each HDA. At 620, the logic simulation application can execute a reactive region set of the IC chip after execution of the active region set. Results of each evaluation of each HDA for the subset of imported modules are reported during execution of the reactive region. As explained herein, results of each HDA are configured/programmed to be one of suspended or inactive in response to a change of a power state of the given power domain during execution of the corresponding active region set for the given time slot.

Referring back to FIG. 8, as explained, execution of the simulation includes execution of the simulation cycle for the plurality of time slots. Thus, operations of the sub-method 600 can be repeated for each of the plurality time slots.

Figure 10:
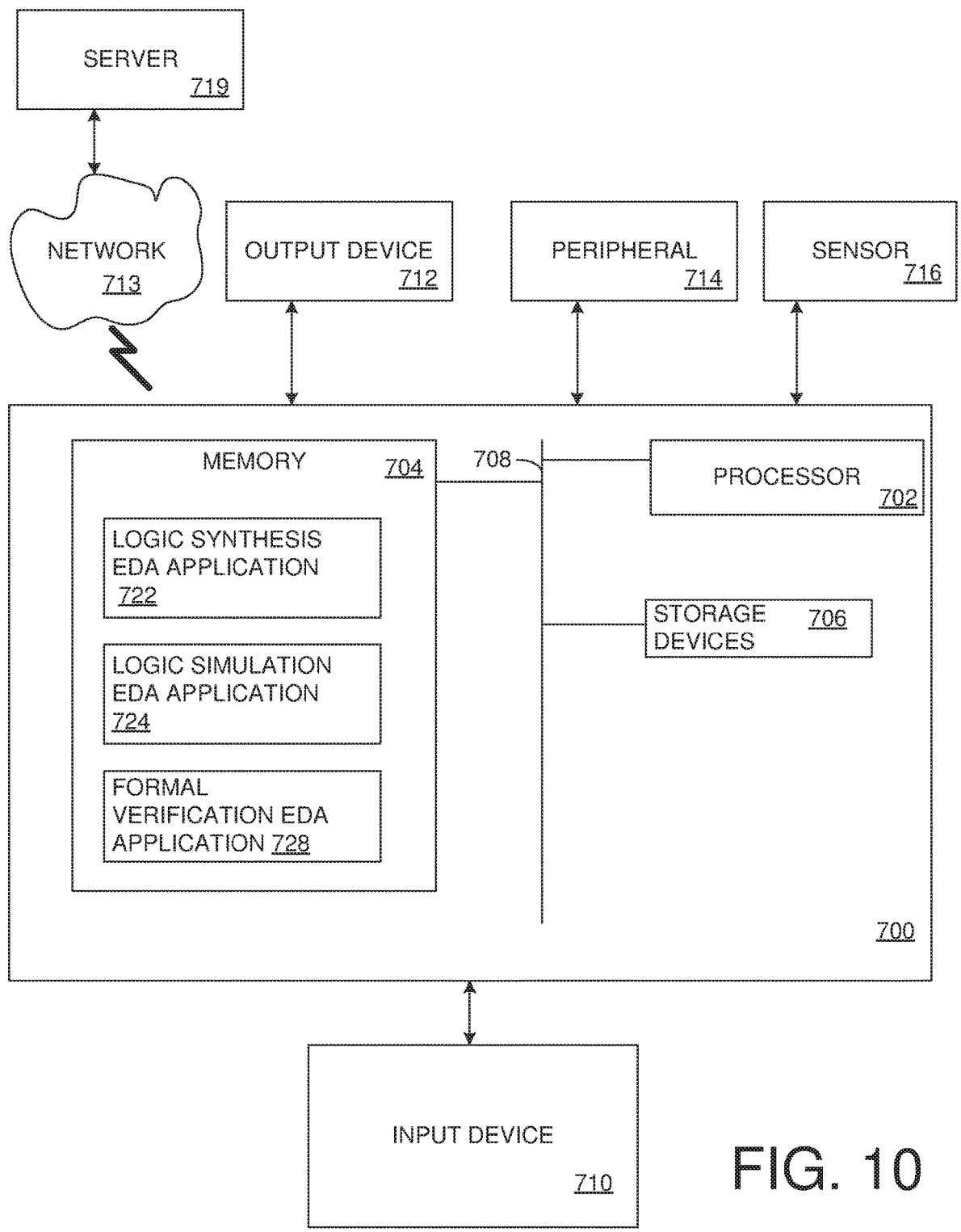
FIG. 10 illustrates an example of a computing system employable to execute a plurality of electronic design automation (EDA) applications including a logic simulation EDA application.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 10, the computing system 700 can include a computer processor 702, associated memory 704 (e.g., random access memory (RAM), cache memory, flash memory, etc.), one or more storage devices 706 (e.g., a solid state drive, a hard disk drive, an optical drive such as a compact disk (CD) drive or digital versatile disk (DVD) drive, a flash memory stick, etc.) and numerous other elements and functionalities. The computer processor 702 may be an integrated circuit for processing instructions. For example, the computer processor may be one or more cores, or micro-cores of a processor. Components of the computing system 700 can communicate over a data bus 708.

The computing system 700 may also include an input device 710, such as any combination of one or more of a touchscreen, keyboard, mouse, microphone, touchpad, electronic pen, or any other input device. Further, the computing system 700 can include an output device 712, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 712 can be the same physical device as the input device 710. In other examples, the output device 712 and the input device 710 can be implemented as separate physical devices. The computing system 700 can be connected to a network 713 (e.g., a local area network (LAN), a wide area network (WAN) such as the Internet, a mobile network, or any other type of network) via a network interface connection (not shown). The input device 710 and output device(s) 712 can be connected locally and/or remotely (e.g., via the network 713) to the computer processor 702, the memory 704 and/or the storage device 706. Many different types of computing systems exist, and the aforementioned input device 710 and the output device 712 can take other forms. The computing system 700 can further include a peripheral 714 and a sensor 716 for interacting with the environment of the computing system 700 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 700 can communicate with a server 719 via the network 713.

The memory 704 can include a plurality of EDA applications that can be employed to generate a circuit design and/or execute a simulation of the circuit design and/or execute formal verification. More particularly, the memory 704 can include a logic synthesis EDA application 722, a logic simulation EDA application 724 and a formal verification EDA application 728 or any combination of these EDA applications. The logic simulation EDA application 724 can convert SIAs of selected imported modules for a circuit design in to corresponding HDAs, as explained herein.

Further, one or more elements of the aforementioned computing system 700 can be located at a remote location and connected to the other elements over a network 713. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine readable instructions, the machine readable instructions comprising a logic simulation electronic design automation (EDA) application, the logic simulation EDA application being configured to:
receive a circuit design of an integrated circuit (IC) chip, the circuit design comprising an imported module comprising a list of simple immediate assertions (SIAs) for the imported module, wherein the circuit design comprises a first power domain and a second power domain, wherein the first power domain controls a power state of the second power domain and the imported module is assigned to the second power domain;
convert, in response to user input, each SIA in the list of SIAs into a respective hybrid deferred assertion (HDA) to form a list of HDAs for the imported module; and
execute a simulation of the IC chip, wherein execution of the simulation comprises execution of a plurality of simulation cycles for a plurality of time slots, wherein execution of a simulation cycle for a given time slot comprises:
executing an active region set of the IC chip, wherein execution of the active region set comprises evaluating each HDA in the list of HDAs and recording results of each evaluation of each HDA; and
executing a reactive region set of the IC chip after execution of the active region set, wherein results of each evaluation of each HDA are reported during execution of the reactive region and wherein the results of each HDA are configured to be one of suspended and inactive in response to a change of state of the second power domain during execution of the corresponding active region set for the given time slot.

2. The medium of claim 1, wherein a subset of HDAs in the list of HDAs is evaluated multiple times during the corresponding active region set in the given time slot.

3. The medium of claim 1, wherein the imported module comprises a list of observed deferred assertions (ODAs), wherein each ODA is evaluated at the end of the active region set for the given time slot.

4. The medium of claim 1, wherein the imported module is a first imported module and the circuit design comprises a second imported module, wherein the second imported module comprises a SIAs for the second imported module, and wherein a subset of the SIAs for the second imported module are evaluated and reported during the given time slot.

5. The medium of claim 1, wherein the active region set comprises:
an active region, wherein the active region includes executing an assertion control and evaluating each HDA in the list of HDAs for the imported module.

6. The medium of claim 5, wherein the reactive region set comprises:
a reactive region, wherein the reactive region includes reporting the results of the evaluation of each HDA in the list of HDAs in the active region.

7. The medium of claim 1, wherein the results of a given HDA of the list of HDAs evaluated during the given time slot comprises a first result for a first evaluation of the given HDA and a second result for a second evaluation of the given HDA if the second power domain remains activated during the active region set of the given time slot.

8. The medium of claim 1, wherein a given HDA of the list of HDAs is evaluated in the active region set prior to the second power domain being deactivated during the active region set and the given HDA is reported as being suspended in the reactive region set independent of the results of the evaluation.

9. The medium of claim 1, wherein results of a given HDA of the list of HDAs evaluated in the active region set prior to the second power domain being deactivated during the active region set are not reported and the given HDA is reported as being suspended after deactivation of the second power domain in the active region set independent of the results of the evaluation in the active region set before deactivation.

10. The medium of claim 1, wherein the circuit design further comprises logic associated with the first power domain for controlling the power state of the second power domain, wherein the logic is configured to change the power state of the second power domain in response to a non-deterministic operation.

11. The medium of claim 10, wherein the circuit design provides a low power IC chip.

12. The medium of claim 10, wherein the low power IC chip is designed for a mobile device.

13. A method comprising:
receiving a circuit design of an integrated circuit (IC) chip, the circuit design comprising a plurality of imported modules, wherein each of the plurality of imported modules comprises a list of simple immediate assertions (SIAs), wherein the circuit design comprises a plurality of power domains, wherein a first power domain of the plurality of power domains controls a power state of a subset of other power domains in the plurality of power domains and a subset of imported modules of the plurality of imported modules is assigned to a given power domain of the other power domains;
selecting by a logic simulator electronic design automation (EDA) application, in response to user input, the subset of the imported modules;
converting, by the logic simulation EDA application each SIA in the list of SIAs for each selected module in the subset of imported modules into a respective hybrid deferred assertion (HDA) to form a list of HDAs for each imported module in the subset of imported modules; and
executing, by the logic simulator EDA application, a simulation of the IC chip, wherein execution of the simulation comprises execution of a plurality of simulation cycles for a plurality of time slots, wherein execution of a simulation cycle for a given time slot comprises:
  executing an active region set for the circuit design, wherein execution of the active region set comprises evaluating each HDA in the list of HDAs for the subset of imported modules and recording results of each evaluation of each HDA; and
  executing a reactive region set of the IC chip after execution of the active region set, wherein results of each evaluation of each HDA for the subset of imported modules are reported during execution of the reactive region and wherein the results of each HDA are configured to be one of suspended or inactive in response to a change of a power state of the given power domain during execution of the corresponding active region set for the given time slot.

14. The method of claim 13, wherein the subset of imported modules comprises a list of observed deferred assertions (ODAs), wherein each ODA is evaluated at the end of the active region set for the given time slot.

15. The method of claim 13, wherein the subset of imported modules is a given subset of imported modules and the plurality of imported modules comprises another subset of imported modules wherein the each imported module in the other subset of imported modules comprises SIAs for the respective imported module in other subset of imported modules, and wherein a subset of the SIAs for the other subset of imported modules are evaluated and reported during the active region set of the given time slot.

16. The method of claim 13, wherein the results of a given HDA of the list of HDAs for a given imported module of the subset of imported modules evaluated during the given time slot comprises a first result for a first evaluation of the given HDA and a second result for a second evaluation of the given HDA if the second power domain is unchanged during the active region set of the given time slot.

17. The method of claim 13, wherein results of a given HDA of the list of HDAs for a given imported module of the subset of imported modules evaluated during the given time slot in the active region set prior to the given domain being deactivated during the active region set are not reported and the given HDA is reported as being suspended after deactivation in the active region set independent of the results of the evaluation in the active region set before deactivation.

18. A system comprising:
  a non-transitory memory to store machine readable instructions; and
  a processor to access the memory and execute the machine readable instructions, the machine readable instructions comprising:
    a logic simulation electronic design automation (EDA) application, the logic simulation EDA application being configured to:
      receive a circuit design of an integrated circuit (IC) chip, the circuit design comprising an imported module comprising a list of simple immediate assertions (SIAs) for the imported module, wherein the circuit design comprises a first power domain and a second power domain, wherein the first power domain controls a power state of the second power domain and the imported module is assigned to the second power domain;
      convert, in response to user input, each SIA in the list of SIAs into a respective hybrid deferred assertion (HDA) to form a list of HDAs for the imported module; and
      execute a simulation of the IC chip, wherein execution of the simulation comprises execution of a plurality of simulation cycles for a plurality of time slots, wherein execution of a simulation cycle for a given time slot comprises:
        executing an active region set of the IC chip, wherein execution of the active region set comprises evaluating each HDA in the list of HDAs and recording results of each evaluation of each HDA; and
        executing a reactive region set of the IC chip after execution of the active region set, wherein results of each evaluation of each HDA are reported during execution of the reactive region and wherein the results of each HDA are configured to be one of suspended or inactive in response to a change of state of the second power domain during execution of the corresponding active region set for the given time slot.

19. The system of claim 18, wherein the results of a given HDA of the list of HDAs evaluated during the given time slot comprises a first result for a first evaluation of the given HDA and a second result for a second evaluation of the given HDA if a power state for the second power domain is unchanged during the active region set of the given time slot.

20. The system of claim 18, wherein results of the given HDA of the list of HDAs evaluated in the active region set prior to the second power domain being deactivated during the active region set are not reported and the given HDA is reported as being suspended after deactivation in the active region set independently of the results of the evaluation in the active region set before deactivation.

* * * * *